US009612323B2

(12) United States Patent
Ishimori

(10) Patent No.: US 9,612,323 B2
(45) Date of Patent: Apr. 4, 2017

(54) RADAR APPARATUS

(71) Applicant: FUJITSU TEN LIMITED, Kobe-shi, Hyogo (JP)

(72) Inventor: Hiroyuki Ishimori, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 337 days.

(21) Appl. No.: 14/471,709

(22) Filed: Aug. 28, 2014

(65) Prior Publication Data

US 2015/0219756 A1    Aug. 6, 2015

(30) Foreign Application Priority Data

Jan. 31, 2014   (JP) .................. 2014-017032

(51) Int. Cl.
| | |
|---|---|
| *G01S 13/06* | (2006.01) |
| *G08G 1/16* | (2006.01) |
| *G01S 7/40* | (2006.01) |
| *G01S 13/34* | (2006.01) |
| *G01S 13/42* | (2006.01) |

(Continued)

(52) U.S. Cl.
CPC .............. *G01S 13/06* (2013.01); *B60W 30/14* (2013.01); *G01S 7/4004* (2013.01); *G01S 13/345* (2013.01); *G01S 13/42* (2013.01); *G01S 13/726* (2013.01); *G01S 13/931* (2013.01); *G08G 1/165* (2013.01); *G08G 1/166* (2013.01); *G01S 2013/9375* (2013.01)

(58) Field of Classification Search
CPC ........ G01S 13/02; G01S 13/06; G01S 7/4004; G01S 13/42; G01S 13/726; G01S 13/345; G01S 13/931; G01S 2013/9375; B60W 30/14; G08G 1/165; G08G 1/166
See application file for complete search history.

(56) References Cited

U.S. PATENT DOCUMENTS

| | | | |
|---|---|---|---|
| 6,900,754 B2 * | 5/2005 | Ono ....................... | G01S 13/345 342/118 |
| 7,675,457 B2 * | 3/2010 | Nakanishi ............... | G01S 3/20 342/118 |

(Continued)

FOREIGN PATENT DOCUMENTS

| | | |
|---|---|---|
| JP | A-2007-093542 | 4/2007 |
| JP | A-2012-103132 | 5/2012 |
| JP | 2012194051 A * | 10/2012 |

*Primary Examiner* — Matthew M Barker
(74) *Attorney, Agent, or Firm* — Oliff PLC

(57) ABSTRACT

On a radar apparatus, a direction derivation part derives a peak angle related to an angle of a target based on reception signals received by a plurality of reception antennas. Then, a detection information derivation part derives, based on the peak angle, target data that are internal data about the target, and stores the derived target data into a memory. A reliability determination part determines a reliability of an object peak angle upon which the target data about the target was derived, the reliability of the object peak angle being determined based on a different peak angle derived concurrently with the object peak angle by the direction derivation part. Then, a data erasure part deletes, based on the reliability of the object peak angle determined by the reliability determination part, the target data relevant to the object peak angle from the memory to exclude the target data from further processing.

10 Claims, 13 Drawing Sheets

(51) Int. Cl.
  *G01S 13/72* (2006.01)
  *G01S 13/93* (2006.01)
  *B60W 30/14* (2006.01)

(56) References Cited

U.S. PATENT DOCUMENTS

| | | | |
|---|---|---|---|
| 7,692,575 B2 * | 4/2010 | Nishimura | G01S 7/03 342/118 |
| 7,928,897 B2 * | 4/2011 | Ishii | G01S 13/42 342/104 |
| 8,779,969 B2 * | 7/2014 | Shimizu | G01S 7/412 342/106 |
| 9,348,023 B2 * | 5/2016 | Asanuma | G01S 13/931 |
| 2014/0347208 A1 * | 11/2014 | Schoor | G01S 7/354 342/133 |

* cited by examiner

| NUMBER OF ANGLES | AND — LATERAL POSITIONAL DIFFERENCE (m) | OR — ST RATIO (dB) | AND — ANGLE DIFFERENCE (deg) | OR — ANGLE POWER DIFFERENCE (dB) |
|---|---|---|---|---|
| 1 | — | THRESHOLD Aa OR ABOVE | — | — |
| 2 | 2.5(m) OR LESS | THRESHOLD Ab OR ABOVE | THRESHOLD B OR ABOVE | THRESHOLD Cb OR ABOVE |
| 3 | 2.5(m) OR LESS | THRESHOLD Ac OR ABOVE | THRESHOLD B OR ABOVE | THRESHOLD Cc OR ABOVE |

| | LONGITUDINAL DISTANCE | UP LOW-RELIABILITY FLAG | DOWN LOW-RELIABILITY FLAG | FULL EXTRAPOLATION FLAG | ONE-SIDE EXTRAPOLATION FLAG | ANGLE LOW-RELIABILITY COUNTER | ON-STATE THRESHOLD |
|---|---|---|---|---|---|---|---|
| (p1) | LESS THAN 70(m) | ON | ON | — | — | +1 | 8 |
| (p2) | LESS THAN 70(m) | EITHER IS ON | EITHER IS ON | — | — | KEEP | — |
| (p3) | LESS THAN 70(m) | OFF | OFF | EITHER IS ON | EITHER IS ON | KEEP | — |
| (p4) | LESS THAN 70(m) | OFF | OFF | OFF | OFF | −1 | — |
| (p5) | 70(m) OR ABOVE | ON | ON | — | — | +2 | 5 |
| (p6) | 70(m) OR ABOVE | EITHER IS ON | EITHER IS ON | — | — | +1 | 8 |
| (p7) | 70(m) OR ABOVE | OFF | OFF | EITHER IS ON | EITHER IS ON | KEEP | — |
| (p8) | 70(m) OR ABOVE | OFF | OFF | OFF | OFF | −1 | — |

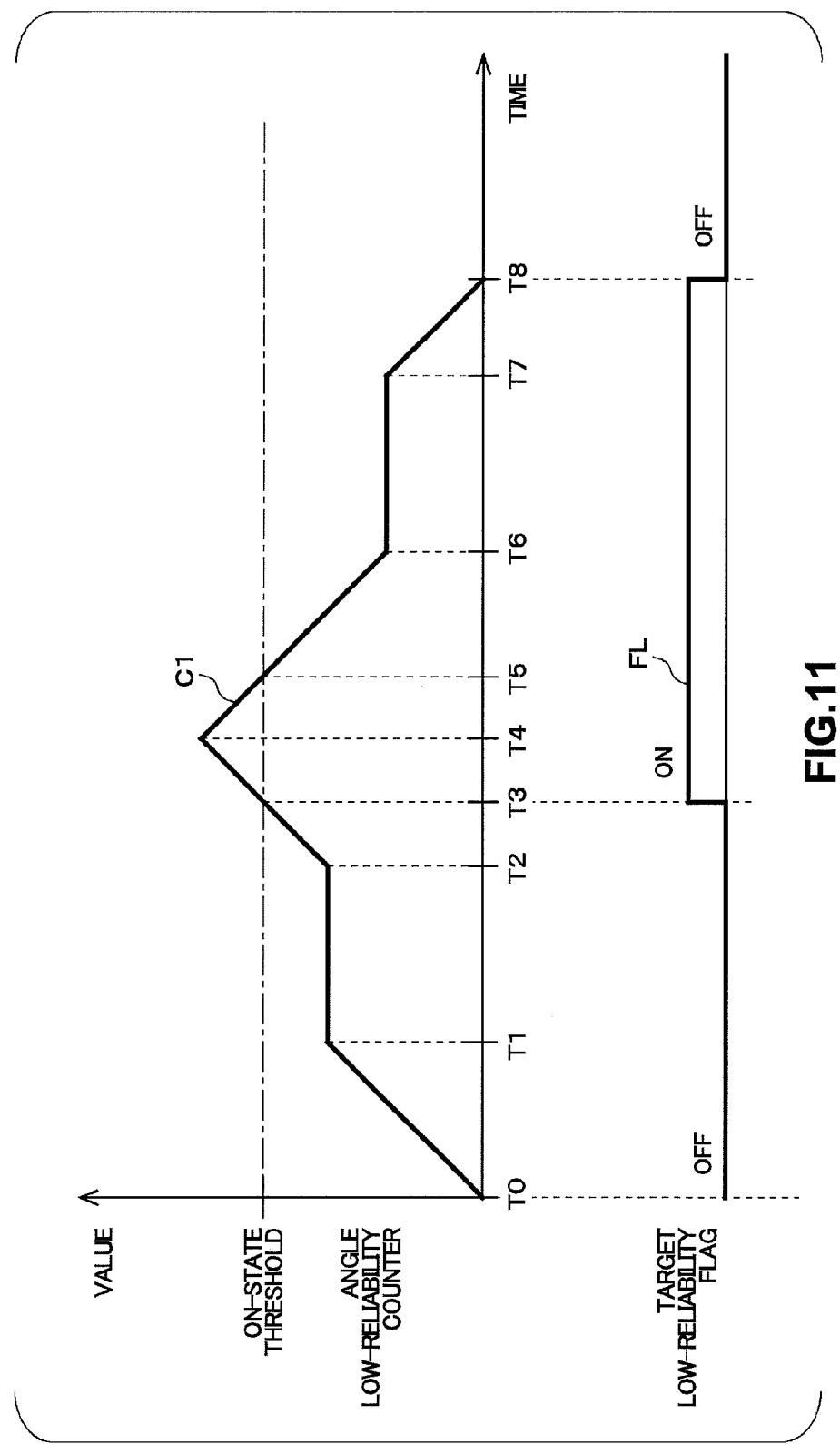

RADAR APPARATUS

BACKGROUND OF THE INVENTION

Field of the Invention

The invention relates to a technology for obtaining information about a target.

Description of the Background Art

Conventionally, on a vehicle control system that follows another preceding vehicle, a vehicle control system that reduces collision with an obstacle or other system, a radar apparatus that obtains information about a target existing in the periphery of a vehicle is used.

The radar apparatus transmits a transmission wave and receives a reflection wave that is reflected by a target such as another vehicle, and then obtains information about the target such as a distance and a relative velocity based on a reception signal. A current radar apparatus receives a reflection wave from a target by a plurality of antennas, and estimates the angle of the target (direction to the vehicle) based on the phases of the reception signals received by the plurality of antennas. As an angle estimation system that estimates an angle of a target, ESPRIT, MUSIC and PRISM are well known.

In the case where there are a plurality of targets at substantially the same distance, the angle estimation system as above estimates the angle of each of the plurality of targets. However, in each of the angle estimation systems, a division possible number that is the number of the targets whose angles are rightly estimated is limited. For example, the division possible number in ESPRIT is "3." In the case where a radar apparatus receives the reflection waves reflected by the targets that exist at substantially the same distance and whose number exceeds the division possible number, the radar apparatus cannot estimate the angles of the targets rightly, and the reliability of the estimated angles is lowered.

The phenomenon in which the reliability of the angles estimated by a radar apparatus is lowered may be occurred in some peripheral environments where a vehicle is traveling, regardless of the number of actual targets. For example, when a vehicle is traveling in a tunnel, even with one actual target existing, since the reflection waves from the target are reflected by the inner wall of the tunnel, a radar apparatus receives the reflection waves from plural directions. Thus, the radar apparatus is in a state as if the radar apparatus receives the reflection waves from the targets that exist at substantially the same distance and whose number exceeds the division possible number. As a result, the radar apparatus cannot estimate the angles rightly, and the reliability of the angles estimated by the radar apparatus is lowered.

In such a case where the reliability of angles estimated by a radar apparatus is lowered, a vehicle control system may perform erroneous control based on incorrect information about a target.

SUMMARY OF THE INVENTION

According to one aspect of the invention, a radar apparatus obtains information about a target. The radar apparatus includes a processor configured to derive a peak angle related to an angle of the target based on reception signals received by a plurality of antennas, and a memory that stores internal data about the target, the internal data being derived based on the peak angle, wherein the processor is further configured to: (i) determine a reliability of a first peak angle that is the peak angle upon which the internal data about the target was derived, the reliability of the first peak angle being determined based on a second peak angle that is a different peak angle from the first peak angle and that was derived concurrently with the first peak angle by the processor, and (ii) determine whether or not to exclude from further processing the internal data about the target that was derived based on the first peak angle, based on the reliability that was determined for the first peak angle.

The processor determines whether or not to exclude the internal data derived upon the peak angle from further processing based on the reliability of the peak angle. Thus, it is possible to exclude, from further processing, the internal data derived upon the peak angle, the reliability of which is low.

According to another aspect of the invention, the processor determines whether or not to exclude the internal data about the target that was derived based on the first peak angle, based on results of determining the reliability of the first peak angle multiple times when multiple peak angles have been determined for a same target It is possible to exclude the internal data derived upon the peak angle, the reliability of which is kept low.

According to another aspect of the invention, the processor outputs, to a vehicle controller that controls a vehicle, information about the target based on the internal data not excluded from further processing by the processor.

It is possible to prevent the vehicle controller from erroneously controlling the vehicle based on the information about the target shown by the internal data derived upon the peak angle, the reliability of which is low.

Therefore, the object of the invention is, in the case where the reliability of a peak angle is low, to exclude internal data showing a target from further processing.

These and other objects, features, aspects and advantages of the invention will become more apparent from the following detailed description of the invention when taken in conjunction with the accompanying drawings.

BRIEF DESCRIPTION OF THE DRAWINGS

FIG. 9 shows reliability conditions.

FIG. 10 shows operation patterns for operating a value of an angle low-reliability counter.

FIG. 11 shows an example of change of a value of the angle low-reliability counter.

DESCRIPTION OF THE EMBODIMENTS

Hereinafter, some embodiments of the invention are described based on attached drawings.

<1. Configuration>

Figure 1:
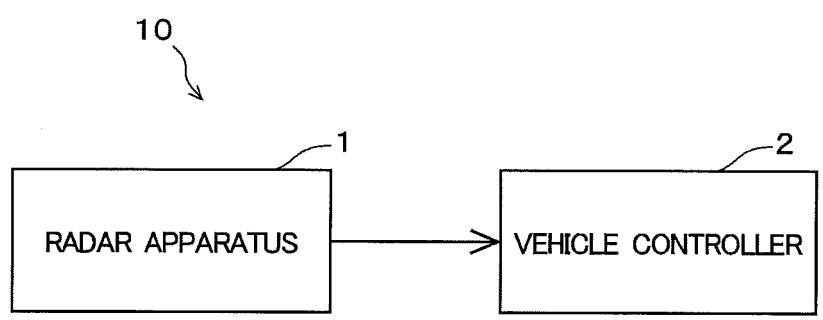
FIG. 1 shows a configuration of a vehicle control system.

FIG. 1 shows a schematic configuration of a vehicle control system 10 of the embodiment. The vehicle control system 10 is installed in a vehicle, for example, in a car. Hereinafter, the vehicle in which the vehicle control system 10 is installed is referred to as "self-vehicle." As shown in FIG. 1, the vehicle control system 10 has a radar apparatus 1 and a vehicle controller 2.

The radar apparatus 1 obtains information about a target existing in the periphery of the self-vehicle (hereinafter, referred to as "target detection information"). The radar apparatus 1 of the embodiment obtains information about a target, such as other vehicle existing in the forward of the self-vehicle, by using FMCW (Frequency Modulated Continuous Wave). The radar apparatus 1 obtains target detection information including a distance (m) to the target in the traveling direction of the self-vehicle (hereinafter, referred to as "longitudinal distance"), a relative velocity (km/h) of the target to the self-vehicle, and a distance (m) to the target in the right and left direction of the self-vehicle (hereinafter, referred to as "lateral position"), and then outputs the obtained target detection information to the vehicle controller 2.

The vehicle controller 2 that is connected to a brake, a throttle and others of the self-vehicle controls behavior of the self-vehicle based on the target detection information output from the radar apparatus 1. The vehicle controller 2, while keeping a following distance between the self-vehicle and other vehicle traveling in the forward of the self-vehicle, controls the behavior of the self-vehicle so as to follow the other vehicle. This allows the vehicle control system 10 of the embodiment to function as an ACC (Adaptive Cruise. Control) system.

Figure 2:
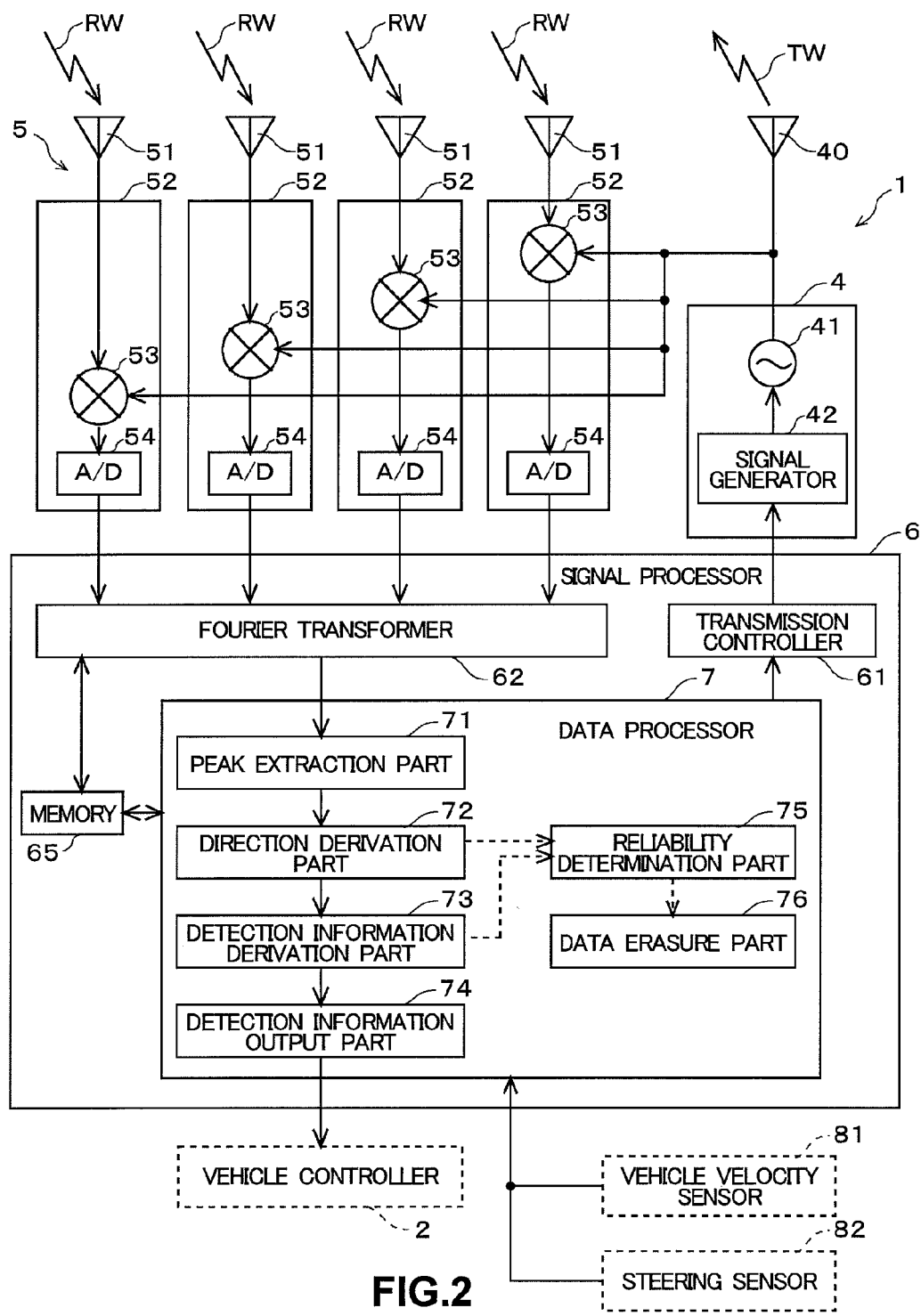
FIG. 2 shows a configuration of a radar apparatus.

FIG. 2 shows a configuration of the radar apparatus 1. The radar apparatus 1 mainly includes a transmission part 4, a receiver 5 and a signal processor 6.

The transmission part 4 includes a transmitter 41 and a signal generator 42. The signal generator 42 generates a modulation signal whose voltage changes in a triangular waveform, and provides the signal to the transmitter 41. The transmitter 41 generates a transmission signal that changes in frequency as time elapses by performing frequency modulation of a continuous wave signal based on the modulation signal generated by the signal generator 42, and then outputs the generated signal to a transmission antenna 40.

The transmission antenna 40, based on the transmission signal output by the transmitter 41, outputs a transmission wave TW outside the self-vehicle. The transmission wave TW to be output by the transmission antenna 40 corresponds to FMCW that periodically changes up and down in frequency. The transmission wave TW that has been output to the forward of the self-vehicle by the transmission antenna 40 turns into a reflection wave RW when the transmission wave TW is reflected by a target such as other vehicle.

The receiver 5 includes a plurality of reception antennas 51 forming an array antenna, and a plurality of individual receivers 52 each of which connects to each of the plurality of reception antennas 51. In the embodiment, the receiver 5 includes, for example, four of the reception antennas 51 and four of the individual receivers 52. Each of the four individual receivers 52 corresponds to each of the four reception antennas 51. Each of the reception antennas 51 receives the reflection wave RW reflected by a target. Each of the individual receivers 52 processes the reception signal received by the corresponding one of the reception antennas 51.

Each of the individual receivers 52 includes a mixer 53 and an A/D converter (analog-to-digital converter) 54. The reception signal obtained based on the reflection wave RW received by each of the reception antennas 51 is transmitted to the mixer 53 after being amplified by a low-noise amplifier (not shown in FIG. 2). The transmission signal is transmitted from the transmitter 41 of the transmission part 4 to the mixer 53, and the mixer 53 carries out mixing of the reception signal and the transmission signal. This generates a beat signal showing a beat frequency that corresponds to the difference between the frequency of the transmission signal and the frequency of the reception signal. The beat signal generated by the mixer 53, after being converted into a digital signal by the A/D converter 54, is output to the signal processor 6.

The signal processor 6 has a microcomputer including a CPU and a memory 65. The signal processor 6 stores various data to be subjected to calculation into the memory 65 that is a storage apparatus. The memory 65 is, for example, a RAM. The signal processor 6 includes a transmission controller 61, a Fourier transformer 62 and a data processor 7, which are the functions implemented by software in the microcomputer. The transmission controller 61 controls the signal generator 42 of the transmission part 4.

The Fourier transformer 62 performs fast Fourier transform (FFT) to the beat signal output by each of the plurality of individual receivers 52. This allows the Fourier transformer 62 to transform the beat signal of the reception signal received by each of the plurality of the reception antennas 51 into a frequency spectrum that corresponds to the data of a frequency domain. The frequency spectrum obtained by the Fourier transformer 62 is transmitted to the data processor 7.

The data processor 7 performs a detection information acquisition processing to derive target detection information (a longitudinal distance, a relative velocity and a lateral position) about the target existing in the forward of the self-vehicle, based on the frequency spectrum of each of the plurality of reception antennas 51. The data processor 7 outputs the derived target detection information to the vehicle controller 2. The data processor 7 receives information from various sensors, such as a vehicle velocity sensor 81 and a steering sensor 82 that are installed on the self-vehicle. The data processor 7 can use various data for processing, such as a velocity of the self-vehicle transmitted from the vehicle velocity sensor 81 and an angle of the self-vehicle transmitted from the steering sensor 82.

FIG. 2 shows, as major functioning parts of the data processor 7, a peak extraction part 71, a direction derivation part 72, a detection information derivation part 73, a detection information output part 74, a reliability determination part 75, and a data erasure part 76. These functioning parts are detailed later.

<2. Acquisition of Target Detection Information>

Figure 3:
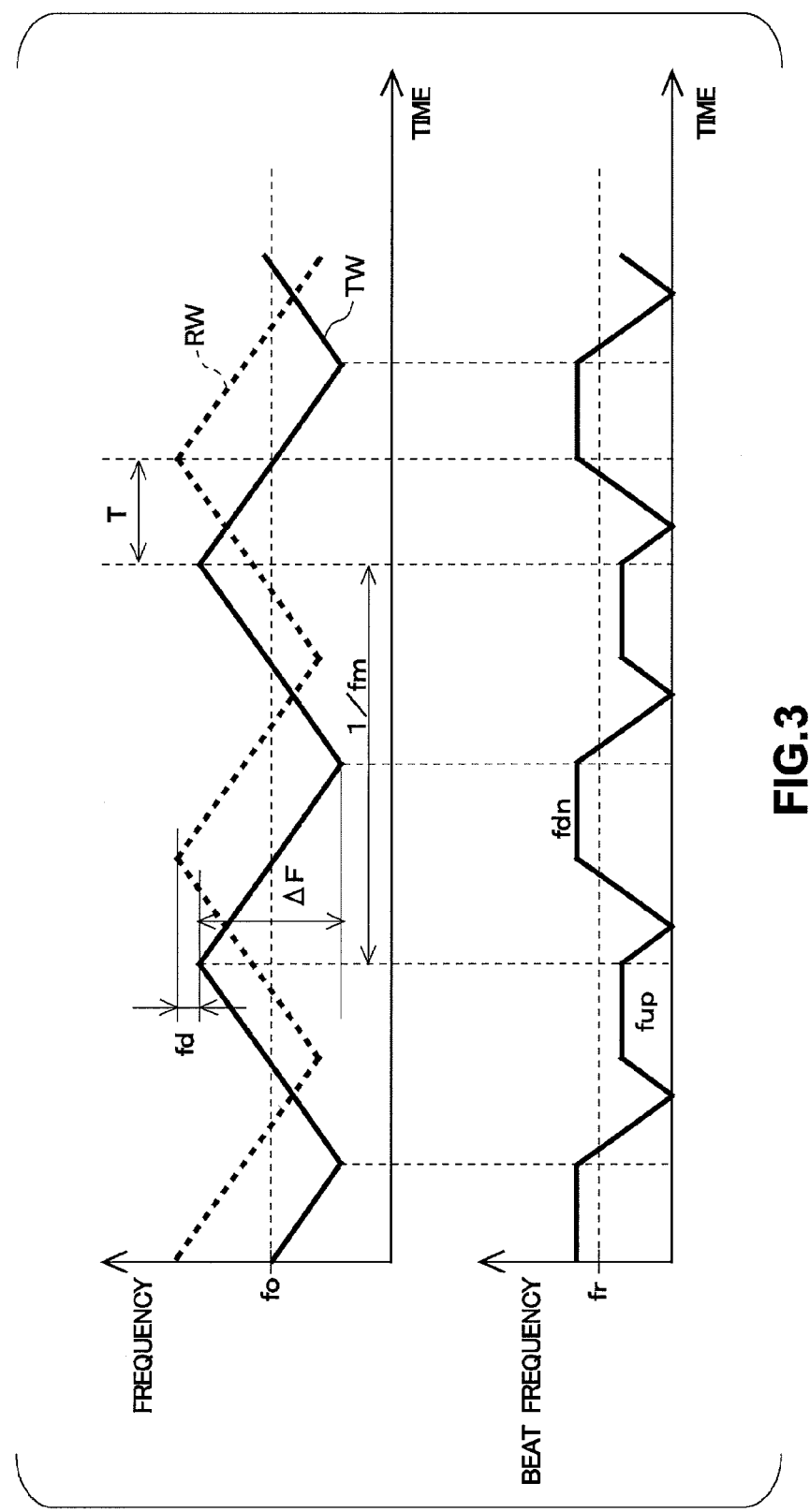
FIG. 3 shows relation between a transmission wave and a reflection wave.

Next explanation is about how (principle) the radar apparatus 1 obtains the target detection information (a longitudinal distance, a relative velocity and a lateral position). FIG. 3 shows the relation between a transmission wave TW and a reflection wave RW. To simplify an explanation, a reflection wave RW reflected by one ideal target is shown in FIG. 3. In FIG. 3, the transmission wave TW is shown with a solid line, and the reflection wave RW is shown with a dotted line. In the upper figure of FIG. 3, the horizontal axis represents time and the vertical axis represents frequency.

As shown in FIG. 3, the transmission wave TW is a continuous wave that periodically changes in frequency up and down from a certain center frequency. The frequency of the transmission wave TW changes linearly to time. Hereinafter, the section where the frequency of the transmission wave TW is rising is referred to as "up section," while the section where the frequency is falling is referred to as "down section." In addition, the center frequency of the transmission wave TW is referred to as fo, the width of change in frequency of the transmission wave TW is as ΔF, and the reciprocal of one up-down cycle of the frequency of the transmission wave TW is as fm.

Since the transmission wave TW turns into the reflection wave RW when the transmission wave TW is reflected by a target, the reflection wave RW is also a continuous wave that periodically changes in frequency up and down from a certain center frequency, just like the transmission wave TW. However, the reflection wave RW is delayed by a time T to the transmission wave TW. The time T that is delay time is relative to a distance (longitudinal distance) R of a target to the self-vehicle, and is represented by Numeral 1 below, by use of the light velocity (velocity of electric waves) c.

$$T = \frac{2 \cdot R}{c} \qquad \text{[Numeral 1]}$$

A Doppler effect corresponding to a relative velocity V of a target to the self-vehicle causes frequency shift by a value of a frequency fd to the transmission wave TW.

As above, the reflection wave RW is, to the transmission wave TW, delayed in accordance with a longitudinal distance, and its frequency is shifted in accordance with a relative velocity. Thus, as shown in the lower figure of FIG. 3, the value of the beat frequency (difference of the frequencies of the transmission wave TW and the reflection wave RW) in the up section of the beat signal generated by the mixer 53 is different from the one in the down section. Hereinafter, the beat frequency in the up section is referred to as fup, and the beat frequency in the down section is as fdn.

In the case where a relative velocity of a target is "0" (in the case of no frequency shift caused by the Doppler effect), the beat frequency is referred to as fr. The beat frequency fr is represented by Numeral 2 below.

$$fr = \frac{fup + fdn}{2} \qquad \text{[Numeral 2]}$$

The value of the frequency fr is relative to the above-described time T that is a delay time. Thus, a longitudinal distance R of the target is obtained based on Numeral 3 below, by use of the frequency fr.

$$R = \frac{c}{4 \cdot \Delta F \cdot fm} fr \qquad \text{[Numeral 3]}$$

A frequency fd by which a frequency is shifted due to the Doppler effect is represented by Numeral 4 below.

$$fd = \frac{fup - fdn}{2} \qquad \text{[Numeral 4]}$$

A relative velocity V of the target is obtained based on Numeral 5 below, by use of the frequency fd.

$$V = \frac{c}{2 \cdot fo} fd \qquad \text{[Numeral 5]}$$

In the description above, a longitudinal distance and a relative velocity of an ideal target are calculated. In reality, the radar apparatus 1 receives reflection waves RW concurrently from a plurality of targets existing in the forward of the self-vehicle. Thus, the frequency spectrum into which the Fourier transformer 62 transformed the beat signal in terms of the reception signal received by one of the reception antennas 51 includes information corresponding to the plurality of targets.

Figure 4:
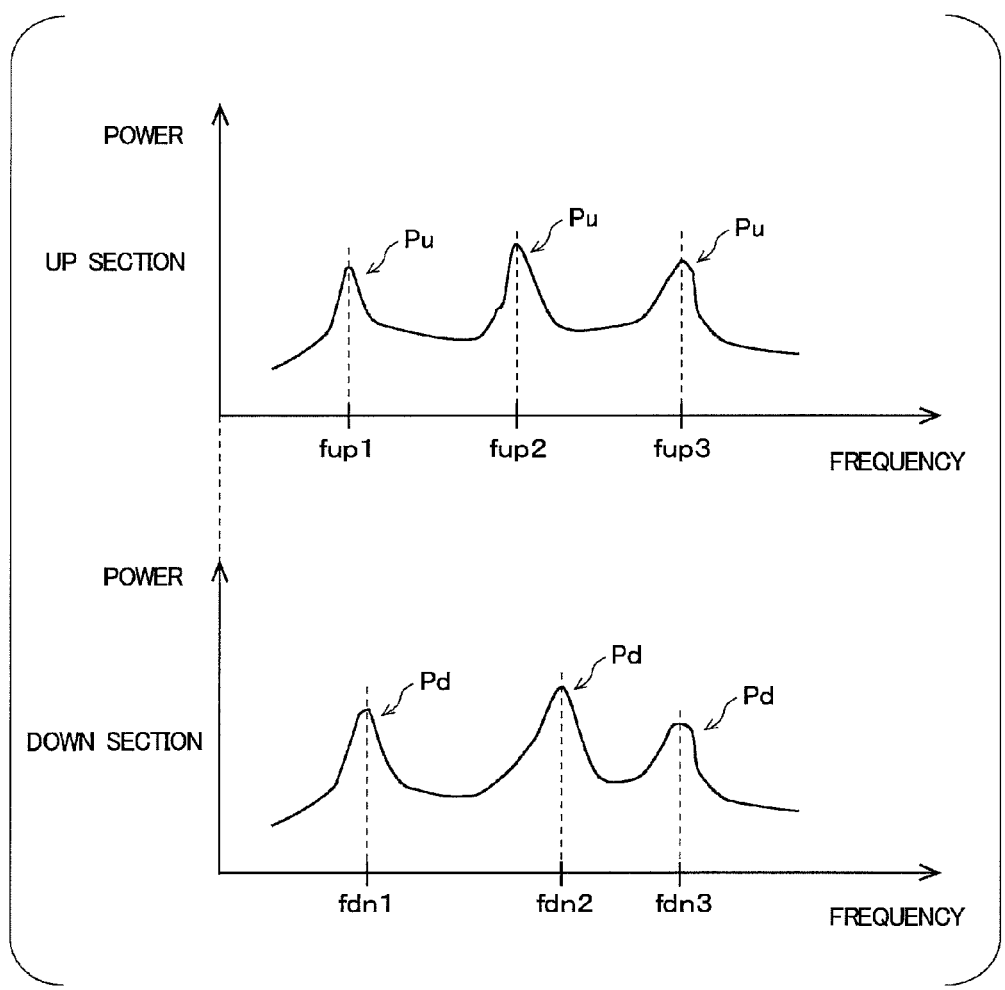
FIG. 4 shows an example of frequency spectrums.

FIG. 4 shows an example of such frequency spectrums. The upper figure of FIG. 4 shows the frequency spectrum in the up section, while the lower figure of FIG. 4 shows the frequency spectrum in the down section. In FIG. 4, each of the horizontal axes represents frequency, and each of the vertical axes represents power of a signal.

The frequency spectrum of the up section shown in the upper figure of FIG. 4 has peaks Pu at three points of a frequency fup1, a frequency fup2, and a frequency fup3 respectively. The frequency spectrum of the down section shown in the lower figure of FIG. 4 has peaks Pd at three points of a frequency fdn1, a frequency fdn2, and a frequency fdn3 respectively.

Without considering a relative velocity, the frequency at the point where the frequency spectrum has a peak is relative to a longitudinal distance of a target. In an example, the frequency spectrum of the up section shows that there are three targets respectively at the longitudinal distances corresponding to the three frequencies fup1, fup2 and fup3 at which three the peaks Pu exist.

Thus, the peak extraction part 71 of the data processor 7 (see FIG. 2) extracts the frequencies corresponding to the peaks Pu and the peaks Pd each of which has a power higher than a prescribed threshold in terms of both of the frequency spectrums of the up section and down section. Hereinafter, the frequency extracted in the manner above is referred to as "peak frequency."

The frequency spectrums of both of the up section and the down section as shown in FIG. 4 are obtained based on the reception signal received by one of the reception antennas 51. Thus, the Fourier transformer 62 derives the two frequency spectrums of the up section and the down section as shown in FIG. 4, based on each of the reception signals received by the four reception antennas 51.

Since each of the four reception antennas 51 receives the reflection wave RW reflected by the same target, the extracted peak frequencies are the same in the frequency spectrums received by the four reception antennas 51. However, since the four reception antennas 51 are located at different positions, the reflection waves RW received by the four reception antennas 51 vary in phase. Thus, the reception signals showing the same peak frequency vary in the phase information according to the reception antennas 51.

In the case where a plurality of targets exist at substantially the same longitudinal distance, the signal of one peak frequency in the frequency spectrum includes information about a plurality of targets. Thus, the direction derivation part 72 of the data processor 7 (see FIG. 2) divides the information about a plurality of targets relevant to the signal based on the signal of the one peak frequency, and estimates respective angles of the plurality of targets, by a direction calculation processing.

The direction derivation part 72 picks up the reception signals having the same peak frequency from the all frequency spectrums of the four reception antennas 51, and estimates the angles of the targets based on phase information of the reception signals by use of a well-known angle estimation system. In the embodiment, the direction derivation part 72 estimates an angle of a target by use of ESPRIT (Estimation of Signal Parameters via Rotational Invariance Techniques) as an angle estimation system. This allows the direction derivation part 72 to derive a plurality of angles based on the signal of one peak frequency. Further, the direction derivation part 72 separates and derives the power of the signal of each of the plurality of angles, based on the signal of one peak frequency.

Figure 5:
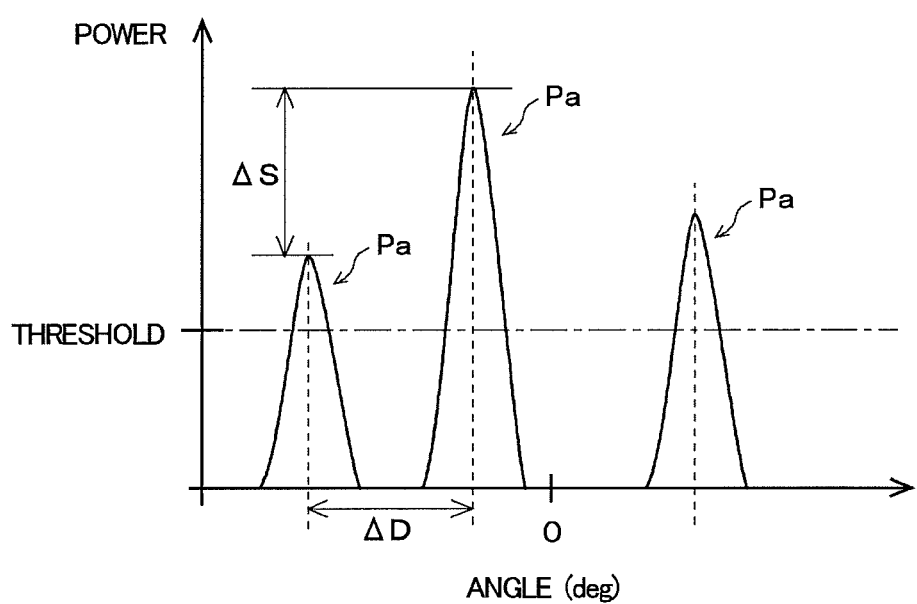
FIG. 5 shows an example of peak angles.

FIG. 5 shows the angles conceptually estimated by the direction derivation part 72 as an angle spectrum. In FIG. 5, the horizontal axis represents angle (degree), and the vertical axis represents power of a signal. Each of peaks Pa in the angle spectrum shown in FIG. 5 shows an angle estimated by the direction derivation part 72. Hereinafter, the angle estimated by the direction derivation part 72 is referred to as "peak angle."

In an angle estimation system, a division possible number that is the number of the targets whose information may be separated based on the signal of one peak frequency (that is, the number of angels of the targets to be estimated, existing at substantially the same longitudinal distance) is limited. The division possible number is "3" in ESPRIT used by the direction derivation part 72 in the embodiment. That is, the direction derivation part 72 estimates three peak angles. Then, the direction derivation part 72, as actual results, selects peak angles whose signal powers exceed a prescribed threshold among the three estimated peak angles. That is, the direction derivation part 72 derives at most three peak angles based on the signal of one peak frequency. Each of at most three peak angles concurrently derived by the direction derivation part 72 shows the angle of each of at most three targets existing at substantially the same longitudinal distance (at the longitudinal distance relative to the targeted peak frequency). The direction derivation part 72 derives peak angles by the processing above in terms of every peak frequency in the frequency spectrums of the up section and of the down section respectively.

By the processing above, the data processor 7 derives section data corresponding to each of the plurality of targets. Each of the section data includes parameter values of the above-described peak frequency, the peak angle and the power of a signal. The data processor 7 derives the section data respectively of the up section and of the down section.

The detection information derivation part 73 of the data processor 7 (see FIG. 2) correlates, by a pairing processing, the section data of the up section and the section data of the down section derived by the processing above. The detection information derivation part 73 correlates the section data of the up section and the section data of the down section based on the parameter values (peak frequency, peak angle, and power of a signal). The detection information derivation part 73 correlates two sets of the section data having similar parameter values to correlate the two of the section data relative to the same target. This allows the detection information derivation part 73 to derive the target data that are internal data showing each of the plurality of targets existing in the forward of the self-vehicle. The target data are also called "pair data" because the two of the section data are obtained as a pair.

The detection information derivation part 73 is capable of deriving the target detection information (longitudinal distance, relative velocity and lateral position) of the target relative to the target data by use of the parameter values of the two section data of the up section and the down section, included in the target data (pair data).

The detection information derivation part 73 uses a peak frequency of the up section as the above-described frequency fup, and a peak frequency of the down section as the above-describe fdn. The data processor 7 is capable of obtaining the longitudinal distance R of the target by use of above-described Numeral 2 and Numeral 3, and capable of obtaining the relative velocity V of the target by use of above-described Numeral 4 and Numeral 5.

In addition, the detection information derivation part 73 obtains an angle θ of the target in Numeral 6 below, by use of a peak angle θup of the up section and a peak angle Odn of the down section. Then, the detection information derivation part 73 is capable of obtaining the lateral position of the target by calculation of trigonometric functions based on the angle θ and the longitudinal distance R of the target.

$$\theta = \frac{\theta up + \theta dn}{2} \qquad \text{[Numeral 6]}$$

<3. Detection Information Acquisition Processing>

Figure 6:
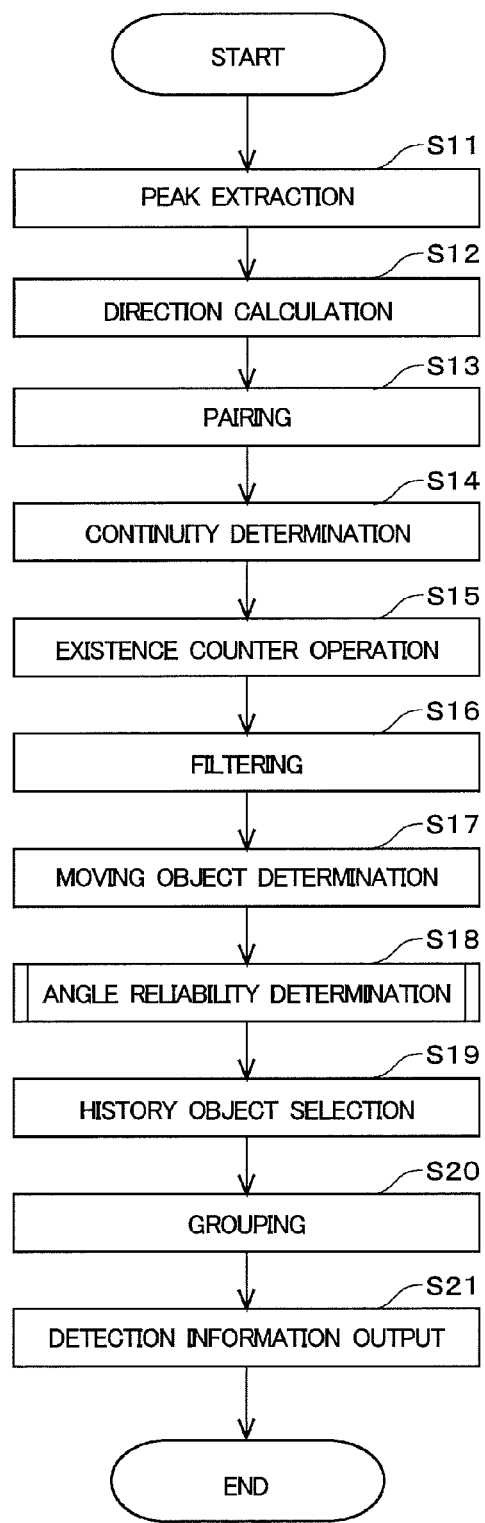
FIG. 6 shows a flow of a detection information acquisition processing.

The following description is about the overall flow of the detection information acquisition processing performed by the data processor 7. FIG. 6 shows the flow of the detection information acquisition processing by the data processor 7. The data processor 7 repeats the detection information acquisition processing shown in FIG. 6, in a successive time and in a prescribed cycle (for example, 1/20 second cycle). At the start of the detection information acquisition processing shown in FIG. 6, the frequency spectrums of both of the up section and the down section relative to each of the four reception antennas 51 are transmitted from the Fourier transformer 62 to the data processor 7.

First, the peak extraction part 71 extracts a peak frequency based on the frequency spectrums (step S11). The peak extraction part 71 extracts as a peak frequency a frequency forming a peak having the power that exceeds a prescribed threshold in the frequency spectrums.

Next, the direction derivation part 72 estimates, in terms of the peak frequency extracted by the peak extraction part 71, the angle of the target relative to the signal of the peak frequency by the direction calculation processing based on ESPRIT. This allows the direction derivation part 72 to derive the peak angle and the power of the signal for each of the plurality of targets existing at substantially the same longitudinal distance (step S12). The direction derivation part 72 derives at most three peak angles from the signal of one peak frequency.

By the processing above, the data processor 7 derives the section data corresponding to each of the plurality of targets existing in the forward of the self-vehicle. The data processor 7 derives, in each of the up section and the down section, the section data having parameter values of the peak frequency, the peak angle, and the power of the signal.

Next, the detection information derivation part 73 correlates the section data of the up section and the section data of the down section by the pairing processing (step S13). The detection information derivation part 73, at the start of this pairing processing, correlates the two section data that are temporally continuous with the target data derived by the detection information acquisition processing in the past. The pairing processing in consideration of past target data is called "history processing."

In the history processing, the detection information derivation part 73 estimates, based on past target data, the parameter values (peak frequency and peak angle) of the section data that may be obtained by the present detection information acquisition processing of the target relevant to the past target data. In the manner above, the detection information derivation part 73 derives non-real section data (hereinafter, referred to as "predictive section data") that include estimated parameters. The detection information derivation part 73 derives the predictive section data of each of the up section and the down section.

Then, the detection information derivation part 73 selects, among a plurality of section data of the up section derived by the present detection information acquisition processing, one of the section data including the parameter values similar to those of the predictive section data of the up section. In the same manner, the detection information derivation part 73 selects, among a plurality of section data of the down section derived by the present detection information acquisition processing, one of the section data including the parameter values similar to those of the predictive section data of the down section.

Then, the detection information derivation part 73 correlates the section data of the up section and the section data of the down section that have been selected based on the predictive section data. In the case where there is only one section data similar to the predictive section data of one of the up section and the down section while there is no section data similar to those of the other section, the detection information derivation part 73 correlates the existing section data and the predictive section data of the section in which there is no section data. The processing of using predictive section data as the section data of one of the up section and the down section is referred to as "one-side extrapolation."

The detection information derivation part 73 performs the history processing as above in terms of a prescribed number of sets (for example, 20 sets) of the target data derived by the detection information acquisition processing in the past. Next, the detection information derivation part 73 correlates the section data of the up section and the section data of the down section that have not been selected in the history processing. The detection information derivation part 73 correlates two section data having similar parameters, for example, by calculation by use of a Mahalanobis distance.

The detection information derivation part 73 derives, in the case where the section data of the up section and the section data of the down section are correlated by the processing above, target data (pair data) based on the two correlated section data. The detection information derivation part 73 derives the longitudinal distance of the target, the relative velocity of the target and the lateral position of the target as the target detection information by the above-described calculation, in terms of each of the derived target data.

The detection information derivation part 73 stores the derived target data as a processing object in the memory 65 of the signal processor 6. Each of the target data corresponds to the internal data showing that a target exists, and includes the two original section data, and the target detection information.

Each of the target data has various kinds of parameters. The parameters of the target data include "existence counter," "moving object flag," "preceding vehicle flag," "one-side extrapolation flag" and "full extrapolation flag."

The "existence counter" represents certainty of existence of the target shown by the target data. The higher the certainty of existence of the target is, the larger the value of the existence counter is. The minimum value of the existence counter is, for example, "0," while the maximum value is, for example, "35."

The "moving object flag" represents whether the target shown by the target data is a moving object or not. The "preceding vehicle flag" represents whether the target shown by the target data is moving toward the same direction as that of the self-vehicle.

The "one-side extrapolation flag" represents whether "one-side extrapolation" is performed on the target data in the present detection information acquisition processing. The "full extrapolation flag" represents whether "full extrapolation" (that is detailed later) is performed on the target data in the present detection information acquisition processing.

Next, the detection information derivation part 73 determines, by performing a continuity determination processing, temporal continuity between the target data derived by the present detection information acquisition processing and the target data derived by the detection information acquisition processing in the past (step S14).

The detection information derivation part 73 estimates the target detection information (longitudinal distance, relative velocity and lateral position) to be obtained by the present detection information acquisition processing, of the target relevant to past target data, based on the past target data. This allows the detection information derivation part 73 to derive non-real target data (hereinafter, referred to as "predictive target data") that include estimated target detection information.

The detection information derivation part 73 selects one set of target data that are similar in target detection information to those of the derived predictive target data, among the present target data. The detection information derivation part 73 determines that the selected one set of the target data has continuity with the past target data and shows the same target as the past target data.

The detection information derivation part 73 determines the continuity in terms of each of the past target data stored in the memory 65. In the case where there is not any of the present target data similar to the predictive target in the processing for the determination, the predictive target data are used as the present target data having continuity with the past target data. The processing for using the predictive target data as the present target data is called "full extrapolation."

The detection information derivation part 73 determines that the target data whose continuity with the past target data cannot be determined show a new target.

Next, the detection information derivation part 73 operates the value Of the existence counter in the present target data (step S15). In terms of the target data showing a new target, the detection information derivation part 73 sets, for example, "8" as an initial value to the existence counter. In terms of the target data showing a target that is not new, the detection information derivation part 73 operates the value of the existence counter in accordance with the result of the present continuity determination, while continuing to use the value of the existence counter of the past target data.

The detection information derivation part 73 operates "+4" to the value of the existence counter of the target data when normally determining that the target data have continuity with the past target data. However, the value of the existence counter does not exceed, in any case, the maximum value (for example, "35") by the operation.

The detection information derivation part 73 keeps the value of the existence counter of the target data in which "one-side extrapolation" is performed, even when determining that the target data have continuity with the past target data. Then, the detection information derivation part 73 sets the one-side extrapolation flag "on" of the target data.

The detection information derivation part 73 operates "−2" to the value of the existence counter of the target data in which "full extrapolation" is performed. Then, the detection information derivation part 73 sets the full extrapolation flag "on" of the target data. Further, the detection information derivation part 73 deletes from the memory 65 the target data whose value of the existence counter is equal to or less than "0" by the operation to the existence counter. The target data in which the value of the existence counter is equal to or less than "0" as above are seen when "full extrapolation" is performed repeatedly in succession. It is highly likely that the target relevant to such target data has disappeared from the forward of the self-vehicle. Thus, the detection information derivation part 73 deletes the target data from the memory 65 to exclude the target data from further processing.

Next, the detection information derivation part 73 performs a filtering processing to the target data showing a target that is not new, so as to smooth the target detection information (longitudinal distance, relative velocity and lateral position) of the target data in a time-axis direction (step S16). Concretely, the detection information derivation part 73 derives new target detection information of the target data, by applying weighted averaging to the target detection information of the target data derived this time as instantaneous values, and the target detection information of the predictive target data used in the continuity determination processing. The weight to the target detection information of the target data derived this time is, for example, "0.25," while the weight to the target detection information of the predictive target data is, for example, "0.75." The target detection information of the target data (pair data) derived as instantaneous values may be, in some case, abnormal values due to the influence of noise or other reason. However, the filtering processing prevents the target detection information from being abnormal values. The target data after the filtering processing may be called "filter data."

Next, the detection information derivation part 73 sets a moving object flag and a preceding vehicle flag for each of the target data after performing a moving object determination processing (step S17).

The detection information derivation part 73, first, derives an absolute velocity and a traveling direction of the target shown by the target data, based on the relative velocity of the target data and the velocity of the self-vehicle obtained from the vehicle velocity sensor 81.

When an absolute velocity of the target shown by the target data is equal to or above a prescribed velocity (for example, 1 km/h), the detection information derivation part 73 determines that the target is a moving object, and sets the moving object flag "on." When an absolute velocity of the target shown by the target data is less than a prescribed velocity (for example, 1 km/h), the detection information derivation part 73 determines that the target is a static object, and sets the moving object flag "off."

When the traveling direction of the target shown by the target data is the same as the self-vehicle, and further an absolute velocity is equal to or above a prescribed velocity (for example, 18 km/h), the detection information derivation part 73 sets the preceding vehicle flag "on." When the target shown by the target data does not satisfy these conditions, the detection information derivation part 73 sets the preceding vehicle flag "off."

Next, the reliability determination part 75 and the data erasure part 76 (see FIG. 2) perform an angle reliability determination processing (step S18). In the angle reliability determination processing, the reliability determination part 75 determines the reliability of peak angles of each of two section data in terms of the target data after the filtering processing. Then, the data erasure part 76, under a prescribed condition based on the determined reliability of the peak angles, deletes the target data from the memory 65 to exclude the target data from further processing. The angle reliability determination processing is detailed later.

Next, the detection information derivation part 73 selects a prescribed number (for example, 20 sets) of target data to be subjected to the history processing (pairing processing at the step S13) in the next detection information acquisition processing (step S19). The detection information derivation part 73, in consideration of the longitudinal distance and the lateral position of the target data, preferentially selects the target data showing the target that is traveling on the same traveling lane as the self-vehicle, and that is closer to the self-vehicle. The detection information derivation part 73 understands the shape of the traveling lane based on the steering angle of the self-vehicle obtained from the steering sensor 82, and determines whether the target is traveling on the same traveling lane as the self-vehicle.

Next, the detection information derivation part 73 performs a grouping processing to make a group with all of the target data relevant to the same object among the entire target data (step S20). In the case where a transmission wave TW is reflected by a vehicle traveling in the forward of the self-vehicle, the transmission wave TW is normally reflected at each of a plurality of reflection points of the vehicle. Since a plurality of reflection waves RW respectively reflected at the plurality of reflection points of the same vehicle reach the radar apparatus 1, the detection information derivation part 73 derives the target data relevant to each of the plurality of reflection points. Since the target shown by the plurality of target data is one vehicle, the detection information derivation part 73 makes a group with such target data. The detection information derivation part 73 makes, for example, a group with the plurality of target data which have substantially the same relative velocity, and have similar longitudinal distances and lateral positions. As the target detection information of the target data after grouping, for example, an averaged value of the target detection information of the plurality of target data subjected to grouping may be adopted.

Next, the detection information output part 74 (see FIG. 2) outputs to the vehicle controller 2 the target detection information (longitudinal distance, relative velocity and lateral position) of the target data that are derived in the manner above and are not excluded from further processing (step S21). In the case where there are a lot of target data, the detection information output part 74 selects a prescribed number (for example, 8 sets) of the target data, and outputs the target detection information including only the selected target data. The detection information output part 74, in consideration of the longitudinal distance and the lateral position of the target data, preferentially selects the target data showing the target that is traveling on the same traveling lane as the self-vehicle, and that is closer to the self-vehicle. The detection information output part 74 understands the shape of the traveling lane based on the steering angle of the self-vehicle obtained from the steering sensor 82, and determines whether the target is traveling on the same traveling lane as the self-vehicle.

<4. Angle Reliability Determination Processing>

Next description is about the angle reliability determination processing (step S18 of FIG. 6) performed by the reliability determination part 75 and the data erasure part 76. The description starts with the problem occurred in the case where the angle reliability determination processing is not performed, based on FIG. 7.

As described above, the division possible number is "3" in ESPRIT used in the embodiment. That is, the direction derivation part 72 derives at most three peak angles as the angles of the targets existing at substantially the same longitudinal distance based on the signal of one peak frequency. Thus, when receiving the reflection waves from four or more targets that exist at substantially the same distance and whose number exceeds the division possible number, the radar apparatus 1 cannot derive the peak angles of these targets correctly, and the reliability of the peak angles is lowered.

The phenomenon where the reliability of the peak angles is lowered is observed in some case of the environments of a vehicle traveling, regardless of the number of actual targets. In the case where a self-vehicle 9 is traveling on a road 100 inside a tunnel as shown in FIG. 7, the phenomenon where the reliability of the peak angles is lowered may be observed.

Figure 7:
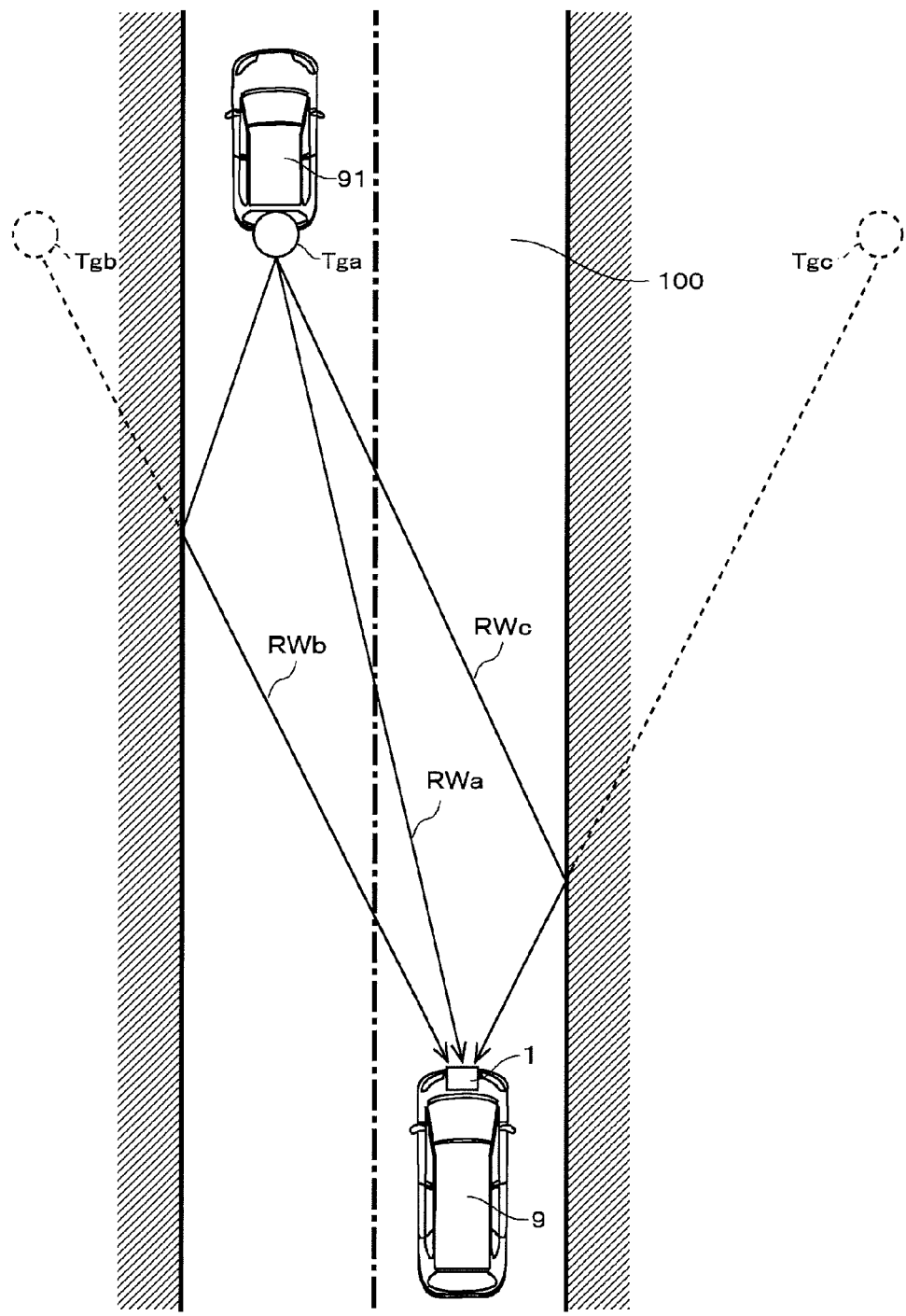
FIG. 7 shows a case example where the radar apparatus is used.

In FIG. 7, another vehicle (hereinafter, referred to as "preceding vehicle") 91 is traveling toward the same direction as the self-vehicle 9 on an adjacent lane in the forward of the self-vehicle 9. In this case, the reflection wave RW reflected by the preceding vehicle 91 is reflected by an inner wall of the tunnel. Thus, the radar apparatus 1 receives a reflection wave RWb, and a reflection wave RWc that are reflected by the inner wall of the tunnel, in addition to a reflection wave RWa that arrives from the preceding vehicle 91 directly. That is, as shown in FIG. 7, the radar apparatus 1 is in a state where the radar apparatus 1 receives the reflection waves RWb and RWc that are the same as the reflection waves RW reflected by a target Tgb and a target Tgc that actually do not exist. The distances of the target Tgb and of the target Tgc are substantially the same distance as an actual target Tga of the preceding vehicle 91.

FIG. 7 shows only two reflection waves RWb and RWc as the reflection wave RW reflected by the inner wall of the tunnel. However, the reflection wave RW reflected by the preceding vehicle 91 is actually reflected at various parts such as ceiling, floor and inner wall. Thus, the radar apparatus 1 is in a state as if the radar apparatus 1 receives the reflection waves RW reflected by four or more targets existing at substantially the same distance.

In this case, due to the effects of those reflection waves RW arriving from various directions, the direction derivation part 72 cannot derive the peak angle of the actual target Tga correctly, which lowers the reliability of the peak angle. In this case, for example, the radar apparatus 1 may erroneously detect the target Tga of the preceding vehicle 91 as a target traveling on the same traveling lane as the self-vehicle 9. Therefore, the vehicle controller 2, in the case of controlling the self-vehicle based on the target detection information of the target, may perform an erroneous control to follow the preceding vehicle 91 traveling on an adjacent lane.

Thus, on the radar apparatus 1 of the embodiment, the reliability determination part 75 determines the reliability of the peak angle derived by the direction derivation part 72, in the angle reliability determination processing. Then, the data erasure part 76 deletes the target data derived based on the low-reliability peak angle, from the memory 65 under a prescribed condition, to exclude the target data from further processing. The detection information output part 74 outputs to the vehicle controller 2 the target detection information of the target data that are not excluded from further processing by the data erasure part 76. This prevents the vehicle controller 2 from performing an erroneous control based on the target detection information relevant to the target data of the low-reliability peak angle.

Figure 8:
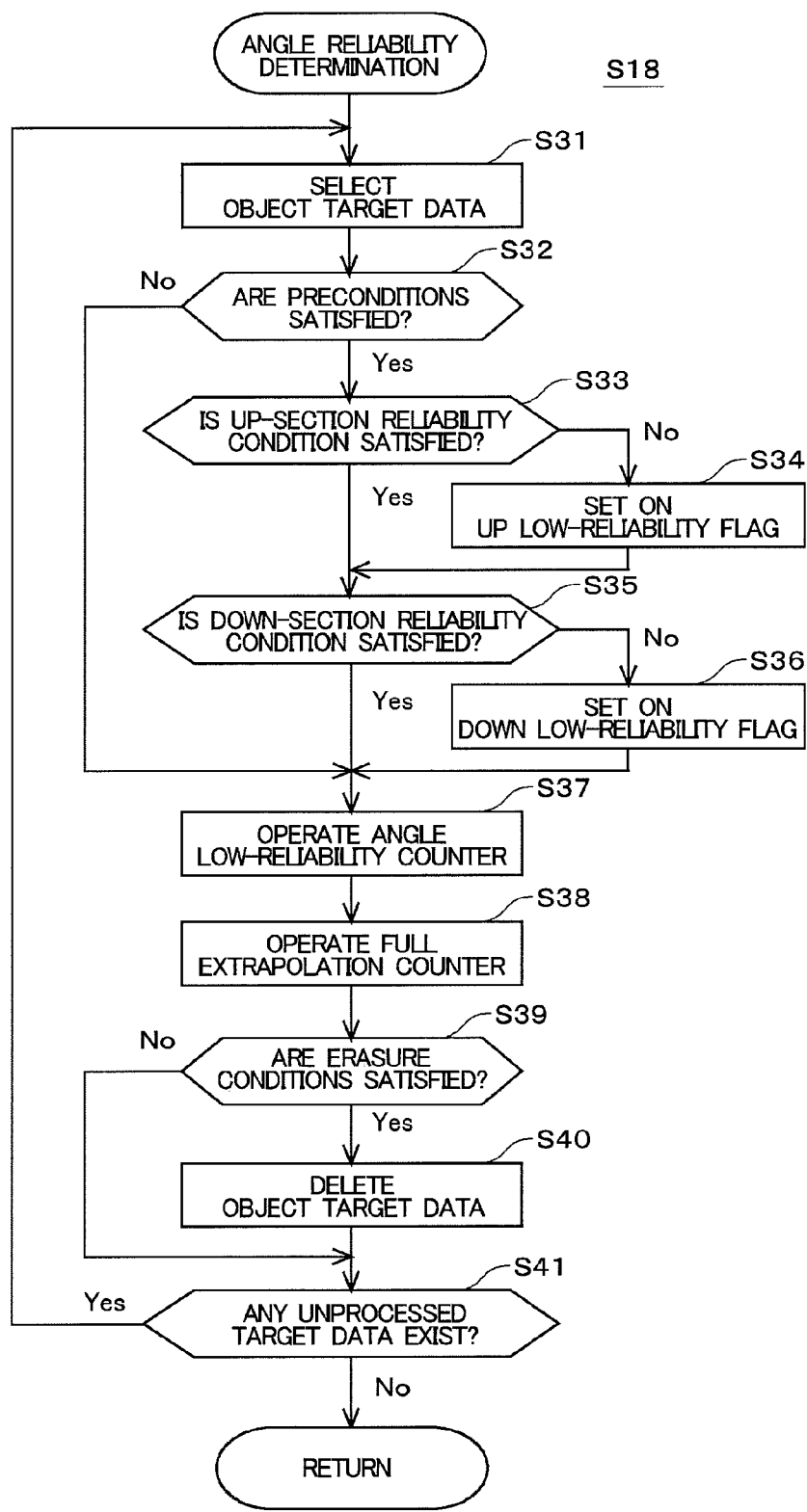
FIG. 8 shows a flow of an angle reliability determination processing.

FIG. 8 shows a detailed flow of the angle reliability determination processing (step S18 of FIG. 6). The angle reliability determination processing is performed to all the target data that are stored in the memory 65 after filtering (step S16 of FIG. 6). The angle reliability determination processing is a part of the detection information acquisition processing shown in FIG. 6. Thus, the angle reliability determination processing is repeated in a successive time and in a prescribed time cycle (for example, 1/20 second cycle).

The angle reliability determination processing uses various parameters set respectively for each of the target data. The parameters of the target data include "up low-reliability flag," "down low-reliability flag," "angle low-reliability counter," "target low-reliability flag" and "full extrapolation counter."

Each of "up low-reliability flag" and "down low-reliability flag" represents whether the reliability of the peak angle of each of the two section data of the up section and the down section included in the target data is low or not. In the case where the reliability of the peak angle of the up section is low, the up low-reliability flag is "on." In the case where the reliability of the peak angle of the down section is low, the down low-reliability flag is "on."

"Angle low-reliability counter" represents lowness of the reliability of the peak angle relevant to the target data themselves, and is operated in accordance with the up low-reliability flag and the down low-reliability flag (which are detailed later). The lower the reliability of the peak angle relevant to target data is, the bigger the value of the angle low-reliability counter is. As for the angle low-reliability counter, the initial value is, for example, "0," the minimum value is, for example, "0," and the maximum value is, for example, "15."

"Target low-reliability flag" represents whether the reliability of the target shown by the target data is low or not, and is set in accordance with the angle low-reliability counter (which is detailed later).

"Full extrapolation counter" represents the frequency at which "full extrapolation" is performed to the target data. The higher the frequency at which "full extrapolation" is performed to the target data is, the bigger the value of the full extrapolation counter is. As for the full extrapolation counter, the initial value is, for example, "0," the minimum value is, for example, "0," and the maximum value is, for example, "10."

Each of "up low-reliability flag" and "down low-reliability flag" is set every time at the detection information acquisition processing, and represents the reliability of the peak angle derived in the direction calculation processing (step S12 of FIG. 6) of this detection information acquisition processing. On the other hand, as for "angle low-reliability counter," "target low-reliability flag" and "full extrapolation counter," the values of the past target data determined in the continuity determination processing (step S14 of FIG. 6) where continuity is determined are taken over as the values of the present target data sequentially. The initial value of each of the up low-reliability flag, the down low-reliability flag and the target low-reliability flag is "off."

The next description is about the flow of the angle reliability determination processing, based on in FIG. 8. First, the reliability determination part 75 selects one set of the target data among all the target data stored in the memory 65 as "object target data" which are objects for processing (step S31).

Next, the reliability determination part 75 determines whether the object target data satisfy all the preconditions from (a1) to (a4) described below (step S32).

(a1) The moving object flag of the object target data is "on."

(a2) The preceding vehicle flag of the object target data is "on."

(a3) The longitudinal distance of the object target data is equal to or more than 30 (m).

(a4) The full extrapolation flag of the object target data is "off."

In the case where the object target data do not satisfy any of the preconditions from (a1) to (a4) (No at the step S32), the processing moves on to a step S37 without determination by the reliability determination part 75, in terms of the reliability of the peak angles of the object target data. In the case where the object target data do not satisfy any of the preconditions from (a1) to (a3), the reliability of the peak angles matters little. In the case where the object target data do not satisfy the precondition of (a4), "full extrapolation" has been performed to the object target data and there is no peak angle to be determined. In this case, the processing moves on to the step S37, while each of the up low-reliability flag and the down low-reliability flag is "off" as is.

In the case where the object target data satisfy all the preconditions from (a1) to (a4) (Yes at the step S32), the reliability determination part 75 determines the reliability of the peak angles of the object target data. The reliability determination part 75 determines the reliability of the peak angle of each of the up section and the down section in terms of the object target data.

First, the reliability determination part 75 determines the reliability in terms of the peak angle of the up section of the object target data (step S33). In the case where the peak angle of the up section does not satisfy a prescribed reliability condition (No at the step S33), the reliability determination part 75 determines that the reliability of the peak angle of the up section is low. In this case, the reliability determination part 75 sets "on" the up low-reliability flag representing that the reliability of the peak angle of the up section is low (step S34). In the case where there is no peak angle of the up section due to "one-side extrapolation," the reliability determination part 75 sets "off" the up low-reliability flag.

Next, the reliability determination part 75 determines the reliability in terms of the peak angle of the down section of the object target data (step S35). In the case where the peak angle of the down section does not satisfy a prescribed reliability condition (No at the step S35), the reliability determination part 75 determines that the reliability of the peak angle of the down section is low. In this case, the reliability determination part 75 sets "on" the down low-reliability flag representing that the reliability of the peak angle of the down section is low (step S36). In the case where there is no peak angle of the down section due to "one-side extrapolation," the reliability determination part 75 sets "off" the down low-reliability flag.

FIG. 9 shows in a table the reliability conditions to be used when the reliability of the peak angle of the object target data is determined. The reliability determination part 75 uses the reliability conditions shown in FIG. 9 for every peak angle of the up section and the down section. In the case where the peak angle to be determined satisfies the reliability conditions shown in FIG. 9, the reliability determination part 75 determines that the reliability of the peak angle is high. Hereinafter, the peak angle to be determined by the reliability determination part 75 is referred to as "object peak angle."

As shown in FIG. 9, the reliability determination part 75 determines "number of angles," "lateral positional difference (m)," "ST ratio (dB)," "angle difference (deg)," and "angle power difference (dB)," as reliability conditions.

The value of "number of angles" represents the number of the peak angles (including the object peak angle) concurrently derived by the direction derivation part 72 in the direction calculation processing for deriving the object peak angle (step S12 of FIG. 6). That is, the value of "number of angles" represents the number of the peak angles (including the object peak angle) into which information is divided from the signal of one peak frequency that is the derivation source of the object peak angle. The case where "number of angles" is "1" corresponds to the case where the direction derivation part 72 derives only the object peak angle. The case where "number of angles" is "2" corresponds to the case where the direction derivation part 72 derives the object peak angle and another peak angle concurrently. Further, the case where "number of angles" is "3" corresponds to the case where the direction derivation part 72 derives the object peak angle and two other peak angles concurrently.

Hereinafter, the other peak angle derived concurrently with the object peak angle by the direction derivation part 72 is referred to as "different peak angle." In the case where "number of angles" is "2" or "3," the reliability determination part 75 determines the reliability of the object peak angle based on the different peak angle(s). Concretely, the reliability determination part 75, based on the relation between the object peak angle and the different peak angle (s), determines whether the object peak angle is affected by the reflection wave from the different peak angle(s) when deriving the object peak angle, to determine the reliability of the object peak angle.

The value of "lateral positional difference" represents the difference between the lateral position based on the object peak angle and the lateral position based on the different peak angle. These lateral positions are obtained by calculation by use of trigonometric functions based on the longitudinal distance of the object target data.

The value of "ST ratio" represents the ratio of the power of the signal (Signal) of the object peak angle to the threshold (Threshold) (see FIG. 5) used by the direction derivation part 72 to derive the object peak angle. The larger the power of the signal of the object peak angle is, the larger the ST ratio is.

The value of "angle difference" represents the difference between the object peak angle and the different peak angle, corresponding to $\Delta D$ in FIG. 5.

The value of "angle power difference" represents the difference between the powers of the signal of the object peak angle and of the signal of the different peak angle. Concretely, "angle power difference" is obtained in a manner where the power of the signal of the different peak angle is deducted from the power of the signal of the object peak angle, corresponding to $\Delta S$ in FIG. 5.

Next, the reliability condition is described for each "number of angles." In the case where "number of angles" is "1," only "ST ratio" is to be determined. In the case where "ST ratio"≥threshold Aa, the reliability determination part 75 determines that the reliability of the object peak angle is high. The threshold Aa is, for example, 0 (dB).

In the case where "number of angles" is "2," first "lateral positional difference" is to be determined. In the case where "lateral positional difference" is equal to or less than 2.5 meters long that is a normal vehicle width, the reliability determination part 75 determines that the reliability of the object peak angle is high. In this case, taking the target of the object peak angle and the target of the different peak angle to be the same vehicle, the reliability determination part 75 determines that the reliability of the object peak angle is high.

In the case where "lateral positional difference" exceeds 2.5 meters, "ST ratio," "angle difference" and "angle power difference" are to be determined. In the case where one of the following conditions (b1) and (b2) is satisfied, the reliability determination part 75 determines that the reliability of the object peak angle is high.

(b1) "ST ratio"≥threshold Ab, and "angle difference"≥threshold B.

(b2) "ST ratio"≥threshold Ab, and "angle power difference"≥threshold Cb.

In these conditions, the threshold Ab is larger than the threshold Aa, and is, for example, 15 (dB). The threshold B is, for example, 8 (deg). The threshold Cb is, for example, 4 (dB).

When the condition (b1) is satisfied, the power of the signal of the object peak angle is relatively large, and the object peak angle and the different peak angle are sufficiently apart from each other. Thus, based on the determination that the object peak angle can be derived without large, effects of the reflection wave from the different peak angle, the reliability determination part 75 determines that the reliability of the object peak angle is high.

When the condition (b2) is satisfied, the power of the signal of the object peak angle is relatively large, and the power of the signal of the object peak angle is sufficiently large compared to the power of the signal of the different peak angle. Thus, based on the determination that the object peak angle can be derived without large effects of the reflection wave from the different peak angle, the reliability determination part 75 determines that the reliability of the object peak angle is high.

Also in the case where "number of angles" is "3," first "lateral positional difference" is to be determined. In the case where "lateral positional difference" in terms of each of the two different peak angles is equal to or less than 2.5 meters long that is a normal vehicle width, the reliability determination part 75 determines that the reliability of the object peak angle is high.

In the case where one of "lateral positional differences" in terms of the two different peak angles exceeds 2.5 meters long, "ST ratio," "angle difference" and "angle power difference" are to be determined. In the case where one of the following conditions (c1) and (c2) is satisfied, the reliability determination part 75 determines that the reliability of the object peak angle is high. In this case, in terms of "angle difference" and "angle power difference," both of the two different peak angles have to satisfy the conditions.

(c1) "ST ratio"≥threshold Ac, and "angle difference"≥threshold B.

(c2) "ST ratio"≥threshold Ac, and "angle power difference"≥threshold Cc.

In these conditions, the threshold Ac is larger than the threshold Ab, and is, for example, 20 (dB). The threshold B is, for example, 8 (deg). The threshold Cc is larger than the threshold Cb, and is, for example, 8 (dB). In the case where "number of angles" is "3," the reliability of the object peak angle tends to be lower compared to the case where "number of angles" is "2." Thus, larger values are used as a part of the thresholds for reliability conditions compared to the case where "number of angles" is "2" so as to make the conditions severer to determine that the reliability of the object peak angle is high.

In the case where the condition (c1) is satisfied, the power of the signal of the object peak angle is relatively large, and each of the two different peak angles is sufficiently apart from the object peak angle. Thus, based on the determination that the object peak angle can be derived without large effects of the reflection wave from each of the two different peak angles, the reliability determination part 75 determines that the reliability of the object peak angle is high.

In the case where the condition (c2) is satisfied, the power of the signal of the object peak angle is relatively large, and the power of the signal of the object peak angle is sufficiently large compared to the power of each signal of the two different peak angles. Thus, based on the determination that the object peak angle can be derived without large effects of the reflection wave from each of the two different peak angles, the reliability determination part 75 determines that the reliability of the object peak angle is high.

After determining the reliability of the peak angles of each of the up section and the down section of the object target data as above, the reliability determination part 75 operates the value of the angle low-reliability counter (hereinafter, a symbol C1 is used) of the object target data (step S37 of FIG. 8).

In addition, the reliability determination part 75 operates the value of the target low-reliability flag (hereinafter, a symbol FL is used) in accordance with the value of the operated angle low-reliability counter C1. In the case where the target low-reliability flag FL is "off," and where the value of the angle low-reliability counter C1 is equal to or more than an on-sate threshold, the reliability determination part 75 sets "on" the target low-reliability flag FL. In the case where the target low-reliability flag FL is "on," and where the value of the angle low-reliability counter C1 is equal to or less than a prescribed off-state threshold, the reliability determination part 75 sets "off" the target low-reliability flag FL.

FIG. 10 shows in a table the operation patterns in which the reliability determination part 75 operates the value of the angle low-reliability counter C1 of the object target data. The reliability determination part 75 operates the value of the angle low-reliability counter C1 in one of the patterns (p1) to (p8) shown in FIG. 10. Each of the patterns includes the on-state threshold for use in the case where the target low-reliability flag FL is set "on."

The patterns (p1) to (p4) correspond to the case where the longitudinal distance of the object target data is less than 70 meters, and the patterns (p5) to (p8) correspond to the case where the longitudinal distance of the object target data is equal to or more than 70 meters. The reliability of the target shown by the object target data having a longer longitudinal distance tend to be lower. Thus, the target low-reliability flag FL of each of the patterns (p5) to (p8) is more easily set "on" than the case of each of the patterns (p1) to (p4).

The case where both of the up low-reliability flag and the down low-reliability flag of the object target data are "on" corresponds to the first pattern (p1) or the fifth pattern (p5)

in accordance with the longitudinal distance. In this case, the reliability of the peak angle of each of the up section and the down section is low.

Thus, in the first pattern (p1), the reliability determination part 75 operates "+1" to the value of the angle low-reliability counter C1. In the case where the target low-reliability flag FL is "off," and where the value of the angle low-reliability counter C1 is equal to or more than the on-state threshold "8," the reliability determination part 75 sets "on" the target low-reliability flag FL. In the fifth pattern (p5), the reliability determination part 75 operates "+2" to the value of the angle low-reliability counter C1. In the case where the target low-reliability flag FL is "off," and where the value of the angle low-reliability counter C1 is equal to or more than the on-state threshold "5," the reliability determination part 75 sets "on" the target low-reliability flag FL.

The case where one of the up low-reliability flag and the down low-reliability flag of the object target data is "on" corresponds to the second pattern (p2) or the sixth pattern (p6) in accordance with the longitudinal distance. In this case, the reliability of the peak angle of either one of the up section and the down section is low.

In the second pattern (p2), the reliability determination part 75 keeps the value of the angle low-reliability counter C1. In the sixth pattern (p6), the reliability determination part 75 operates "+1" to the value of the angle low-reliability counter C1. In the case where the target low-reliability flag FL is "off," and where the value of the angle low-reliability counter C1 is equal to or more than the on-state threshold "8," the reliability determination part 75 sets "on" the target low-reliability flag FL.

The case where both of the up low-reliability flag and the down low-reliability flag of the object target data are "off," and where either one of the full extrapolation flag and the one-side extrapolation flag is "on" corresponds to the third pattern (p3) or the seventh pattern (p7) in accordance with the longitudinal distance. In this case, "full extrapolation" or "one-side extrapolation" is performed to the object target data. Both in the third pattern (p3) and the seventh pattern (p7), the reliability determination part 75 keeps the value of the angle low-reliability counter C1.

The case where both of the up low-reliability flag and the down low-reliability flag of the object target data are "off," and where both of the full extrapolation flag and the one-side extrapolation flag are "off" corresponds the fourth pattern (p4) or the eight pattern (p8) in accordance with the longitudinal distance. In this case, the object target data are derived normally.

In each of the fourth pattern (p4) and the eight pattern (p8), the reliability determination part 75 operates "−1" to the value of the angle low-reliability counter C1. In the case where the target low-reliability flag FL is "on," and where the value of the angle low-reliability counter C1 is equal to or less than a prescribed off-state threshold (for example, "0"), the reliability determination part 75 sets "off" the target low-reliability flag FL.

FIG. 11 shows one example of change with time of the values of the angle low-reliability counter C1 and the target low-reliability flag FL operated in the manner above. At a time T0, the value of the angle low-reliability counter C1 is "0," and the target low-reliability flag FL is "off." FIG. 11 shows the case where the longitudinal distance of the object target data is less than 70 meters.

In the time period from the time T0 to a time T1, both of the up low-reliability flag and the down low-reliability flag are "on." Thus, since this case corresponds to the first pattern (p1), the value of the angle low-reliability counter C1 increases.

In the next time period from the time T1 to a time T2, both of the up low-reliability flag and the down low-reliability flag are "off," and the full extrapolation flag is "on." Thus, since this case corresponds to the third pattern (p3), the value of the angle low-reliability counter C1 is kept as is.

In the next time period from the time T2 to a time T4, both of the up low-reliability flag and the down low-reliability flag are "on." Thus, since this case corresponds to the first pattern (p1), the value of the angle low-reliability counter C1 increases. At a time T3 in this period, since the value of the angle low-reliability counter C1 is equal to or more than the on-state threshold, the target low-reliability flag FL is set "on."

In the next time period from the time T4 to a time T6, both of the up low-reliability flag and the down low-reliability flag are "off," and both of the full extrapolation flag and one-side extrapolation flag are "off." Since this case corresponds to the fourth pattern (p4), the value of the angle low-reliability counter C1 decreases. At a time T5 in this period, although the value of the angle low-reliability counter C1 is equal to or less than the on-state threshold, the target low-reliability flag FL is kept "on" as is.

In the next time period from the time T6 to a time T7, both of the up low-reliability flag and the down low-reliability flag are "off," and the one-side extrapolation flag is "on." Since this case corresponds to the third pattern (p3), the value of the angle low-reliability counter C1 is kept as is.

In the next time period from the T7 to a time T8, both of the up low-reliability flag and the down low-reliability flag are "off," and both of the full extrapolation flag and the one-side extrapolation flag are "off." Since this case corresponds to the fourth pattern (p4), the value of the angle low-reliability counter C1 decreases. At the time T8, since the value of the angle low-reliability counter C1 is equal to or less than the off-state threshold "0," the target low-reliability flag FL is set "off."

As above, the value of the target low-reliability flag FL reflects the results where the reliability determination part 75 has determined multiple times the reliability of the peak angle relevant to the target data showing the same target. In the case where the reliability of the peak angle of the target data is kept low, the target low-reliability flag FL of the target data is set "on."

After operating the value of the angle low-reliability counter C1 of the object target data as above, the reliability determination part 75 operates the value of the full extrapolation counter (hereinafter, a symbol C2 is used) (step S38 of FIG. 8). The reliability determination part 75 operates the value of the full extrapolation counter C2 in accordance with the full extrapolation flag and the one-side extrapolation flag of the object target data.

In the case where the full extrapolation flag is "on," the reliability determination part 75 operates "+1" to the value of the full extrapolation counter C2. In the case where the one-side extrapolation flag is "on," the reliability determination part 75 keeps the value of the full extrapolation counter C2. In the case where both of the full extrapolation flag and the one-side extrapolation flag are "off," the reliability determination part 75 operates "−1" to the value of the full extrapolation counter C2.

Figure 12:
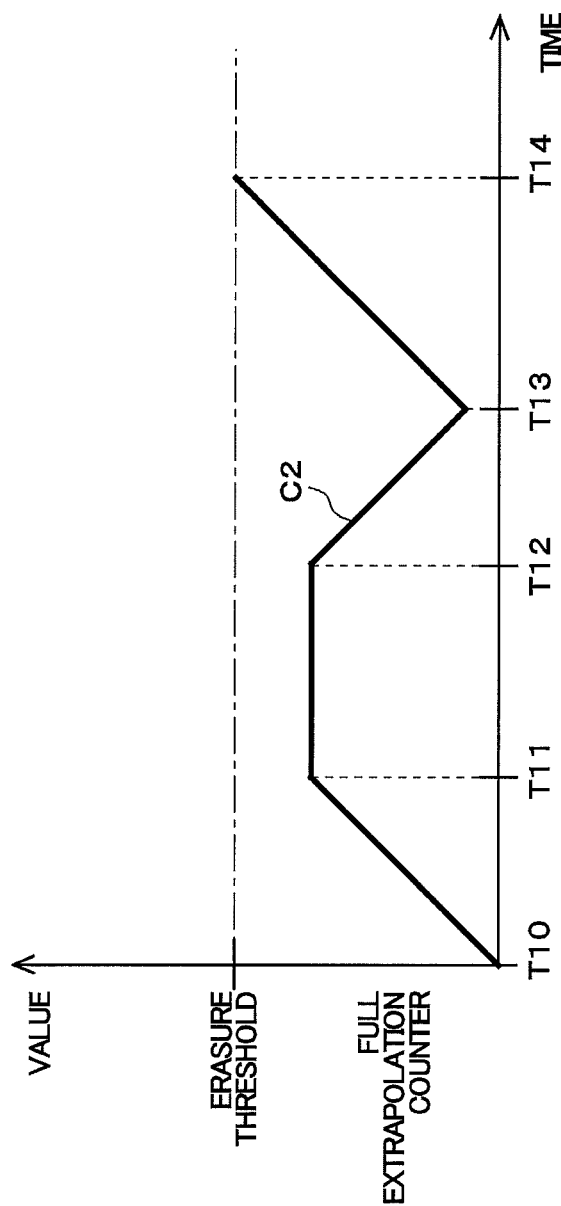
FIG. 12 shows an example of change of a value of a full extrapolation counter.

FIG. 12 shows one example of change with time of the value of the full extrapolation counter C2 operated as above. At a time T10, the value of the full extrapolation counter C2 is "0."

In the time period from the time T10 to a time T11, since the full extrapolation flag is "on," the value of the full extrapolation counter C2 increases. In the next time period from the time T11 to a time T12, since the one-side extrapolation flag is "on," the value of the full extrapolation counter C2 is kept as is. In the next time period from the time T12 to a time T13, since both of the full extrapolation flag and the one-side extrapolation flag are "off," the value of the full extrapolation counter C2 decreases. In the next time period from the time T13 to a time T14, since the full extrapolation flag is "on," the value of the full extrapolation counter C2 increases.

After operating the value of the full extrapolation counter C2 of the object target data as above, the reliability determination part 75 determines whether the object target data satisfy all of the following erasure conditions (d1) to (d6) (step S39 of FIG. 8). In order to obtain the value of the power of the signal of the peak angle for use in the condition (d4), the powers of the signals of the peak angles derived in the detection information acquisition processing performed by a prescribed number of times (for example, 10 times) in the past are averaged.

(d1) The moving object flag of the object target data is "on."

(d2) The preceding vehicle flag of the object target data is "on."

(d3) The longitudinal distance of the object target data is equal to or more than 70 (m).

(d4) The power of the signal of the peak angle of the object target data is equal to or more than −30 (dB).

(d5) The target low-reliability flag FL of the object target data is "on."

(d6) The value of the full extrapolation counter C2 of the object target data is equal to or more than an erasure threshold.

In the case where the object target data do not satisfy any of the conditions (d1) to (d6) (No at the step S39), the data erasure part 76 keeps the object target data stored in the memory 65. In the case where the object target data satisfy all of the erasure conditions (d1) to (d6) (Yes at the step S39), the data erasure part 76 deletes the object target data from the memory 65 to exclude the target data from further processing (step S40).

In the example of FIG. 12, the value of the full extrapolation counter C2 is equal to or more than the erasure threshold (for example, "5") at the time T14, and the condition (d6) is satisfied. Thus, if the object target data satisfy the other conditions (d1) to (d5) as well, the data erasure part 76 deletes the object target data from the memory 65 at the time T14.

In the case where the target low-reliability flag FL is on as indicated in the condition (d5), that is, where the reliability of the peak angle of the target data is kept low, the data erasure part 76 deletes the object target data from the memory 65. This deletes the target data in which the reliability of the peak angle is low, to exclude the target data from further processing. Therefore, this prevents the vehicle controller 2 from performing erroneous control based on the target detection information about the target data in which the reliability of the peak angle is low.

Every time the processing to one set of target data is completed in the manner above, the reliability determination part 75 determines whether any of unprocessed target data that are not treated as object target data exist in the memory 65 (step S41). In the case where such data exist (Yes at the step S41), the reliability determination part 75 selects another one of the target data as new object target data (step S31), and performs the same processing as above. This processing is repeated until when the last of the target data stored in the memory 65 is processed, so as to exclude all of the target data in which the reliability of the peak angle is low from further processing.

The radar apparatus 1, by performing the angle reliability determination processing as above, is capable of deleting the target data in which the reliability of the peak angle is low, more speedy than the normal case of deleting the target data based on the existence counter (step S15), to exclude those target data from further processing.

Figure 13:
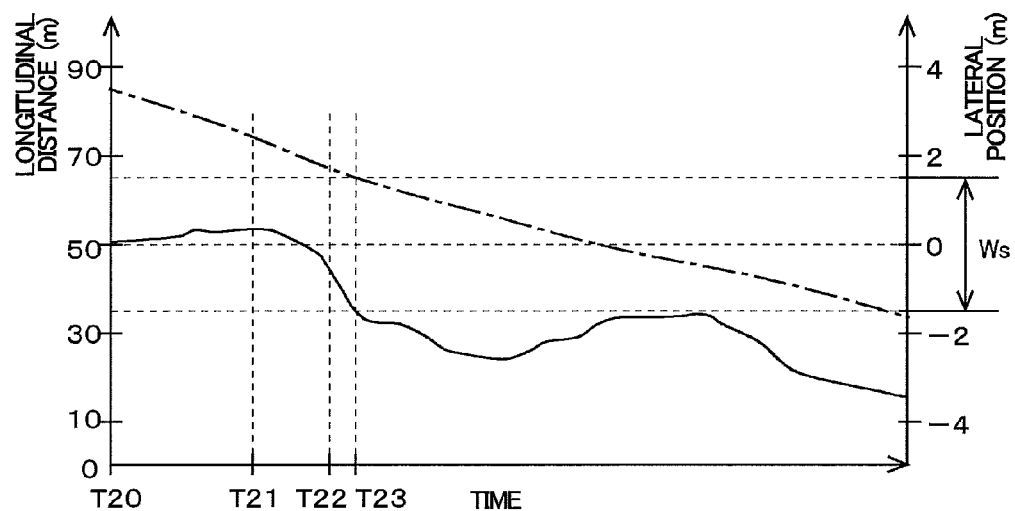
FIG. 13 shows a transition example of a derived longitudinal distance and a derived lateral position.
Figure 14:
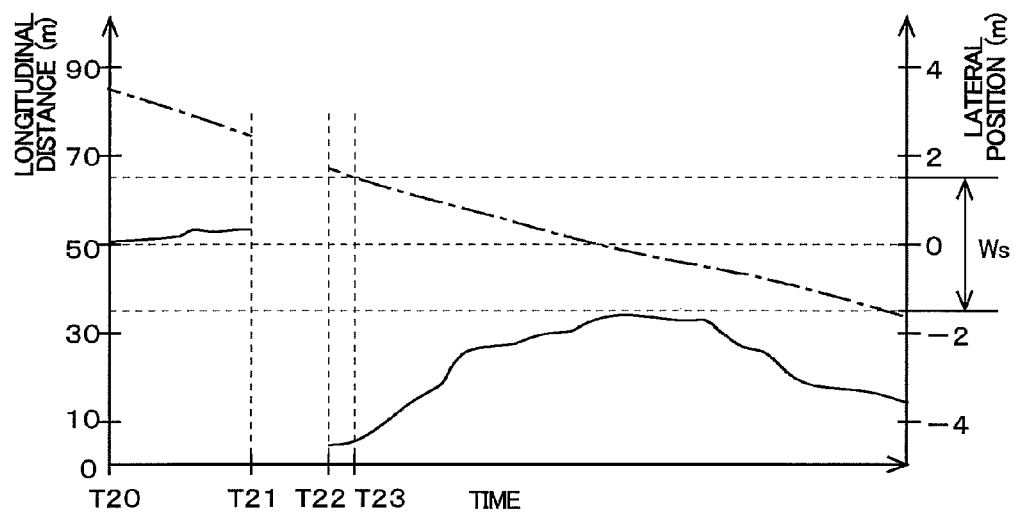
FIG. 14 shows another transition example of the derived longitudinal distance and the derived lateral position.

Each of FIG. 13 and FIG. 14 shows transition examples of the longitudinal distance and the lateral position derived in terms of the target data relevant to the same target. FIG. 13 shows the case where the angle reliability determination processing is not performed, and FIG. 14 shows the case where the angle reliability determination processing is performed. In each of the figures, the horizontal axis represents time, and the left line of the vertical axes represents a longitudinal distance and the right line of the vertical axes represents a lateral position. In each of the figures, the chain line represents a longitudinal distance of the target data, while the solid line represents a lateral position of the target data.

The target shown by the target data in each of the figures is an actual vehicle traveling on the left lane adjacent to the self-vehicle 9, like the preceding vehicle 91 shown in FIG. 7. The radar apparatus 1 of the embodiment understands, for example, the target data whose lateral position (absolute value) is equal to or less than 1.5 meters (the target data whose lateral position is within the rage of Ws in each of the figures), as the target data of the target traveling on the same traveling lane.

As shown in FIG. 13, in the case where the angle reliability determination processing is not performed, the longitudinal distance and the lateral distance of the target data are derived continuously. Frequently-performed "full extrapolation" is necessary to delete the target data based on the existence counter, while intermittently-performed "full extrapolation" is not enough to delete the target data immediately.

Thus, as shown in FIG. 13, even though "full extrapolation" is performed to the target data, the target data are kept as is stored in the memory 65 without deletion. Then, in the time period from a time T20 to a time T23, a distance equal to or less than 1.5 meters is derived as the lateral position (absolute value) of the target data, and the target data are erroneously understood as the target data showing the target traveling on the same traveling lane. Therefore, the vehicle controller 2 may perform erroneous control to follow the target based on the target detection information of the target data.

On the other hand, in the case where the angle reliability determination processing is performed, the target data are deleted from the memory 65 at a time T21 as the target data in which the reliability of the peak angle is low, as shown in FIG. 14. In the case where the angle reliability determination processing is performed, the target that is more likely to be understood erroneously can be deleted from the memory 65 immediately as above to exclude the target data from further processing. This prevents the vehicle controller 2 from performing erroneous control. Then, the target data of the target are newly derived at a time T22 as the target data whose lateral position (absolute value) exceeds 1.5 meters (target data of the target traveling on a different traveling lane).

As above, in the radar apparatus 1 of the embodiment, the direction derivation part 72 drives the peak angle showing the angle of the target based on the reception signals received by the plurality of reception antennas 51. Then, the detection information derivation part 73 derives the target data that are internal data showing the target based on the peak angle, and stores the derived target data in the memory 65. The reliability determination part 75 determines the reliability of the object peak angle relevant to the target data, based on the different peak angle(s) derived concurrently with the object peak angle by the direction derivation part 72. Then, the data erasure part 76 deletes the target data relevant to the object peak angle from the memory 65 based on the reliability of the object peak angle determined by the reliability determination part 75, to exclude the target data from further processing. This excludes the target data in which the reliability of the peak angle is low, from further processing.

Moreover, the data erasure part 76 excludes the target data from further processing, based on the target low-reliability flag FL representing the results where the reliability determination part 75 determines plural times the reliability of the peak angles relevant to the target data showing the same target. The reliability of the peak angle used as an instantaneous value may be low due to the effects of noise or other reason. However, using the target low-reliability flag FL can exclude from further processing the target data in which the reliability of the peak angle is kept low.

<5. Modification>

The embodiment of the invention has been described so far. However, the invention is not limited to the embodiment described above, and may provide various modifications. Hereafter, these modifications are described. All embodiments including the embodiment described above and the embodiments to be described below can be arbitrarily combined with others.

In the embodiment described above, the data erasure part 76 deletes from the memory 65 the target data in which the reliability of the peak angle is low to exclude the target data from further processing. However, the target data in which the reliability of the peak angle is low may be excluded from further processing by another method. In an example, a detection information output part 74, keeping the target data in which the reliability of the peak angle is low in a memory 65 without deletion from the memory 65, may exclude the target data from further processing by not selecting the target data as the objects to be output to a vehicle controller 2.

In the embodiment described above, ESPRIT is used as an angle estimation system for a direction calculation processing. However, MUSIC, PRISM or other system may be used as an angle estimation system.

Moreover, the electric power of an orthogonal component of a mode vector in accordance with a peak angle may be additionally considered as a reliability condition for determining the reliability of the peak angle. The electric power of the orthogonal component increases in the case where a radar apparatus receives more reflection waves RW than a division possible number in an angle estimation system. Thus, the fact that the electric power of the orthogonal component is smaller than a prescribed threshold may be set as one of the reliability conditions.

In the embodiment described above, the radar apparatus 1 includes four reception antennas 51. However, a radar apparatus may include five or more reception antennas, or include less than four reception antennas, unless it includes only one reception antenna. Normally, the more the number of reception antennas increases, the larger the division possible number in an angle estimation system becomes.

In the embodiment described above, the vehicle controller 2 controls the behavior of the self-vehicle so as to follow another vehicle. However, a vehicle controller 2 may control the behavior of the self-vehicle for other purposes, for example, for reducing collision with obstacles.

In the embodiments described above, various functions are implemented by software, specifically by processing based on programs. However, some or all of these functions may be implemented by electrical hardware circuits. Contrarily, in the embodiments described above, the function implemented as a block may be implemented by the combination of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A vehicle control apparatus comprising:
a vehicle controller that controls a vehicle; and
a radar apparatus that obtains information about a target existing in a periphery of the vehicle, the radar apparatus comprising:
a plurality of antennas from which reception signals are generated from reflected waves received by the plurality of antennas, the reflected waves caused from a transmission wave reflected by the target;
a processor configured to derive a peak angle, which is an angle of the target relative to the vehicle, based on the reception signals generated from the plurality of antennas; and
a memory that stores internal data about the target, the internal data being derived based on the peak angle;
wherein the processor is further configured to:
determine a reliability of a first peak angle that is the peak angle upon which the internal data about the target was derived, the reliability of the first peak angle being determined based on a second peak angle that is a different peak angle from the first peak angle and that was derived concurrently with the first peak angle by the processor,
determine whether or not to exclude from further processing the internal data about the target that was derived based on the first peak angle, based on the reliability that was determined for the first peak angle,
exclude from further processing the internal data about the target that was determined to be excluded, and
output, to the vehicle controller, information about the target based on the internal data not excluded from further processing by the processor;
wherein the vehicle controller controls the vehicle using the information about the target output to the vehicle controller by the processor of the radar apparatus.

2. The apparatus of claim 1, wherein
the processor determines whether or not to exclude the internal data about the target that was derived based on the first peak angle, based on results of determining the reliability of the first peak angle multiple times when multiple peak angles have been determined for a same target.

3. The apparatus of claim 1, wherein
the processor excludes the internal data about the target that was derived based on the first peak angle from further processing by deleting the internal data about the target that was derived based on the first peak angle from the memory.

4. The apparatus of claim 1, wherein
the processor determines the reliability of the first peak angle based on a difference between the first peak angle and the second peak angle.

5. The apparatus of claim 1, wherein
the processor determines the reliability of the first peak angle based on a difference between a power of the first peak angle and a power of the second peak angle.

6. A vehicle control method using target data that has been obtained about a target existing in a periphery of a vehicle, the method comprising the following steps:
(a) deriving, with a processor of the vehicle, a peak angle, which is an angle of the target relative to the vehicle, based on reception signals generated from a plurality of antennas of the vehicle, the plurality of antennas receiving reflected waves caused from a transmission wave reflected by the target;
(b) storing, with the processor of the vehicle, internal data about the target in a memory, the internal data being derived based on the peak angle;
(c) determining, with the processor of the vehicle, a reliability of a first peak angle that is the peak angle upon which the internal data about the target was derived, the reliability of the first peak angle being determined based on a second peak angle that is a different peak angle from the first peak angle and that was derived concurrently with the first peak angle in the step (a);
(d) determining, with the processor of the vehicle, whether or not to exclude from further processing the internal data about the target that was derived based on the first peak angle, based on the reliability that was determined for the first peak angle in the step (c);
(e) the processor of the vehicle excluding from further processing the internal data about the target that was determined to be excluded in the step (d);
(f) the processor of the vehicle outputting, to a vehicle controller that controls the vehicle, information about the target based on the internal data not excluded from further processing in the step (e); and
(g) the vehicle controller controlling the vehicle using the information about the target output in the step (f).

7. The method of claim 6, wherein
the step (d) determines whether or not to exclude the internal data about the target that was derived based on the first peak angle, based on results of the step (c) performed multiple times when multiple peak angles have been determined for a same target.

8. The method of claim 6, wherein
the step (d) excludes the internal data about the target that was derived based on the first peak angle from further processing by deleting the internal data about the target that was derived based on the first peak angle from the memory.

9. The method of claim 6, wherein
the step (c) determines the reliability of the first peak angle based on a difference between the first peak angle and the second peak angle.

10. The method of claim 6, wherein
the step (c) determines the reliability of the first peak angle based on a difference between a power of the first peak angle and a power of the second peak angle.

* * * * *